United States Patent [19]

Linnér

[11] Patent Number: 5,165,566
[45] Date of Patent: Nov. 24, 1992

[54] END CLOSURE, A METHOD FOR ITS APPLICATION ON HOLLOW TUBULAR PROFILES AND A DEVICE FOR PERFORMING SAID APPLICATION

[75] Inventor: Hans Linnér, Kalmar, Sweden

[73] Assignee: Norden Pac Development AB, Kalmar, Sweden

[21] Appl. No.: 312,011

[22] Filed: Feb. 17, 1989

[30] Foreign Application Priority Data

Feb. 18, 1988 [SE] Sweden ............................. 8800548

[51] Int. Cl.⁵ .......................... B65D 8/22; B65D 43/14
[52] U.S. Cl. ..................................... 220/359; 220/613
[58] Field of Search ............... 215/232, 31, 2, 263; 220/359, 613

[56] References Cited

U.S. PATENT DOCUMENTS

| 834,719 | 10/1906 | Genese | 215/232 |
|---|---|---|---|
| 3,064,844 | 11/1962 | Hoffmann | 215/31 |
| 3,561,982 | 2/1971 | Oeth | 220/359 |
| 3,902,617 | 9/1975 | Valyi | 215/2 |
| 4,094,460 | 6/1978 | Scanga et al. | 215/232 X |
| 4,141,463 | 2/1979 | Smith | 220/359 |
| 4,402,451 | 9/1983 | Woerz et al. | 220/613 |
| 4,527,699 | 7/1985 | Namba et al. | 220/613 |
| 4,531,930 | 7/1985 | Clauss | 220/359 |
| 4,553,679 | 11/1985 | Hatakeyama et al. | 215/232 |
| 4,561,555 | 12/1985 | Miller | 215/31 X |
| 4,606,470 | 8/1986 | Barlics | 215/232 |
| 4,664,274 | 5/1987 | Konrad | 215/232 |
| 4,667,842 | 5/1987 | Collins | 220/359 |

FOREIGN PATENT DOCUMENTS

| 2129736 | 12/1971 | Fed. Rep. of Germany | 215/2 |
|---|---|---|---|
| 0068452 | 5/1980 | Japan | 215/232 |
| 585650 | 3/1977 | Switzerland | 215/232 |
| 1352253 | 4/1971 | United Kingdom . | |

Primary Examiner—Stephen Marcus
Attorney, Agent, or Firm—Jacobson, Price, Holman & Stern

[57] ABSTRACT

An end closure, a method for application of said closure in hollow tubular profiles (10), formed of a thin-walled plastic or plastic-laminate material, and a device for performing said application. The end closure (16) is provided with a partly tapered cylindrical insert wall portion (12; 18) and a circumferentially extending, groove (20) which is adapted to receive the hollow tubular profile (10) in a heat sealable joint.

4 Claims, 2 Drawing Sheets

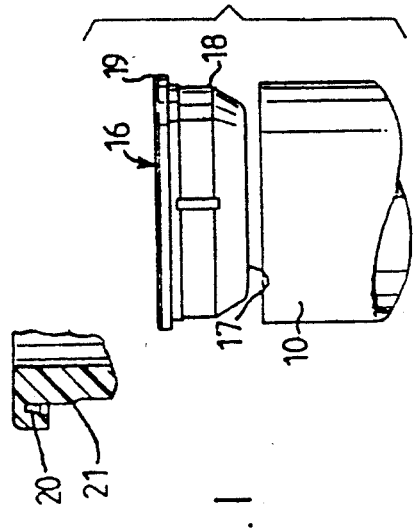
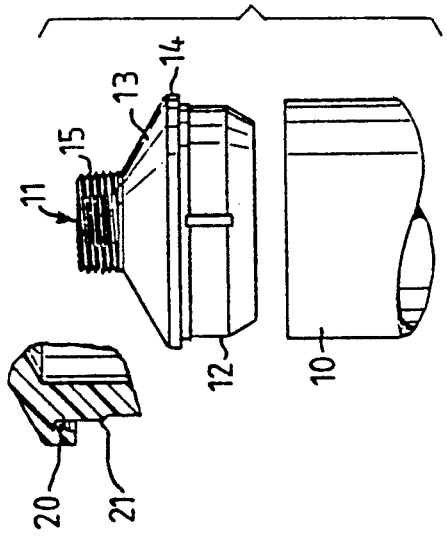
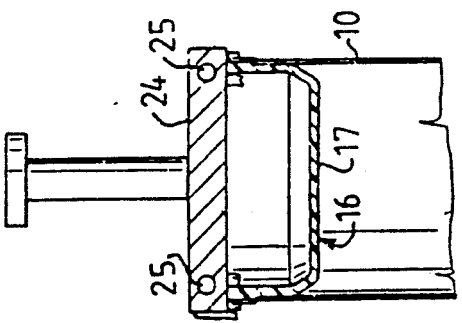
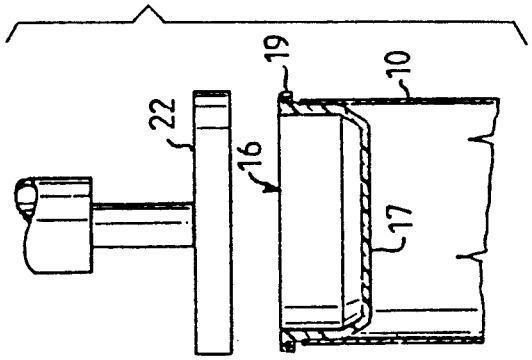

END CLOSURE, A METHOD FOR ITS APPLICATION ON HOLLOW TUBULAR PROFILES AND A DEVICE FOR PERFORMING SAID APPLICATION

FIELD OF THE INVENTION

The present invention relates to an end closure, a method for its application on hollow tubular profiles formed of a thin-walled plastic or plastic-laminate material, and a device for performing said application.

BACKGROUND OF THE INVENTION

Tubes and bottles of the above mentioned materials are used as containers, e. g. for creams, ointments and various other fluid or semi-fluid substances from chemical engineering.

The thin-walled material of the tubular profile leads to a narrow joint between the tubular profile and the end closure, and that comparatively elaborate methods must be used to achieve the required sealing. Various methods are known, for forming a tube neck or a bottle neck at one end of a preformed tubular profile, whereupon the opposite end, after filling of the thus formed container, is sealed by means of a linear seal.

Usually said neck end closures are injection molded upon the tubular profile. These tube blanks are delivered to a customer which fills the blanks with the substance of his choice and then seals them, in a prior art tube filling machine. The consequence of this method is that empty bulky containers must be shipped long distances. Alternatively, separate injection molded details are mounted at the end of the tubular profile by means of welding. Also these methods require so big machine installations, that is not economical for a single packager to produce his own tubes, so that the tubes will have to be shipped from a central manufacturer.

SUMMARY OF THE INVENTION

One object of the invention is to provide an end closure which by means of the method and the device according to the invention, may be mounted with high accuracy, quality and at a high rate by means of simple machine equipment which may be integrated with existing tube filling machines.

The end closure according to the invention is characterized by a partly tapered cylindrical insert wall portion and a circumferentially extending, groove which is adapted to receive the hollow tubular profile in a heat sealable joint. The realization of this end closure makes it possible, e.g. to produce bottles at a high rate and with simple means, from a tubular profile, wherein the filling of the bottles can be effected through the bottom end, whereafter the bottom end may be sealed by an end closure to complete the bottle. Alternatively a bottle neck may be installed after the bottom of the bottle has been filled.

According to one preferable embodiment of the invention, the wall portion is provided with a circular continuous or intermittent bead which runs along the radially inner wall of the groove, and defines an intermediate position during application of the closure, so that the end closure is partially entered into each end of the respective tubular profile. The end closure may either form the tube neck or the tube bottom of a flexible tube or bottle container.

The method according to the invention is characterized in that the end closure is entered in one of the ends of the tubular profile, to a defined intermediate position, partly reaching into the tubular profile, that heating energy to soften the plastic material is fed to the end of the tubular profile, and to the section of the end closure protruding out of said hollow profile, and that the end closure is pressed into its final position in the tubular profile.

According to one embodiment of the method, the heating is obtained by high frequency welding.

Alternatively, the heating energy is supplied in the form of hot air, which may be drawn along a predetermined path away from the joint of the end closure and the tubular profile. In this way a concentrated heating of the joint may be achieved, without any notable heating of neighboring parts of the tubular profile.

According to another embodiment of the invention, the hot air is recirculated via heating means to the joint of the present or the following tubular profile and end closure, reducing the consumption of energy and the effects upon the surrounding environment.

The device for application of end closures is characterized by application means for mounting of an end closure in a defined intermediate position being partly entered in one end of each respective tubular profile, heating means for supply of heating energy to soften the plastic material, to the end of the tubular profile, and to the section of the end closure protruding out of said hollow profile, and means to press the end closure into its final position in the tubular profile.

Preferably, the heating means comprise a cover to envelop the mounting position of the end closure, at a certain distance, said cover having radially inward aimed exhaust passages for hot air coming from a hot air generator. The cover may be provided with a central suction passage which is connected to vacuum means.

Preferably, the hot air generator and the suction passage are interconnected via a return passage.

BRIEF DESCRIPTION OF THE DRAWINGS

One embodiment of the invention will now be described with reference to the accompanying drawings, in which FIG. 1 is a side view of a tubular profile with a tube neck according to the invention, FIG. 1A is a fragmentary enlarged vertical sectional view of the upper left hand portion of FIG. 1, FIG. 2 is a side view of a tubular profile with a bottom end closure according to the invention, FIG. 2A is a fragmentary enlarged vertical sectional view of the upper left hand portion of FIG. 2, FIGS. 3–5 discloses in three steps the mounting of a bottom end closure on a tubular profile.

DESCRIPTION OF A PREFERRED EMBODIMENT

Figure 6:
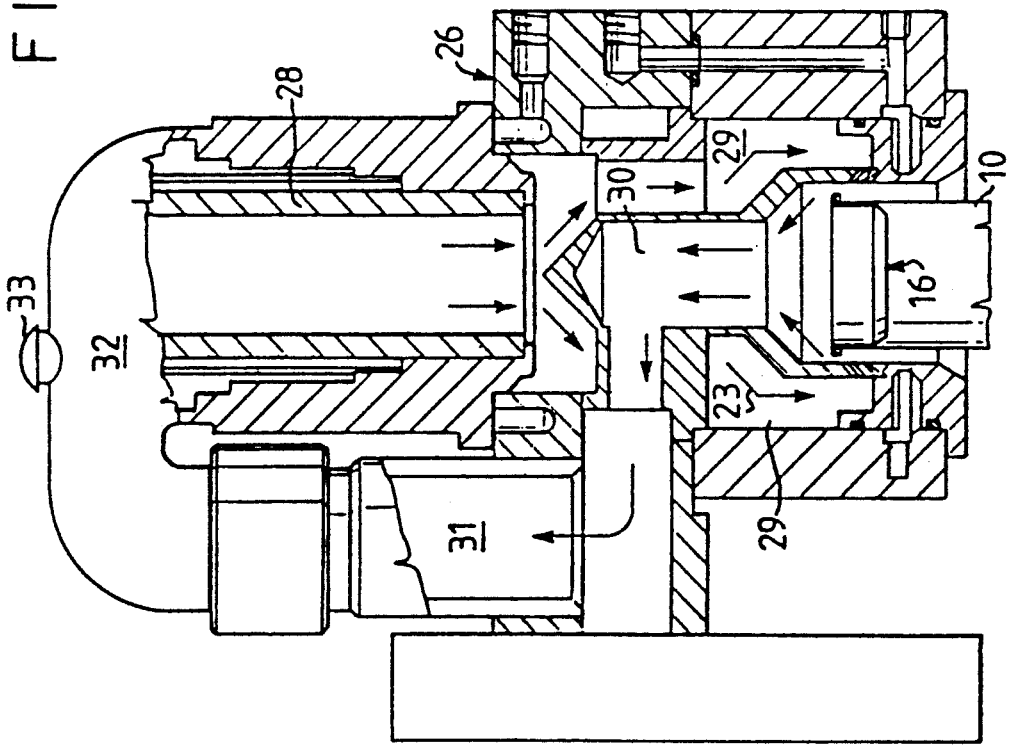
FIG. 6 shows a device for performing the supply of heating energy shown in FIG. 4.
Figure 6A:
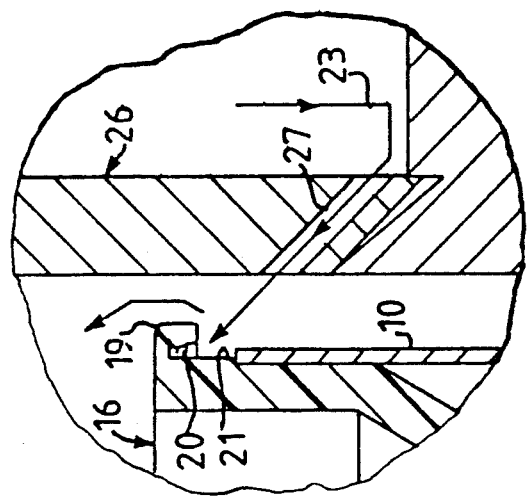
FIG. 6A is a fragmentary enlarged vertical sectional view of the lower right hand portion of FIG. 6.

The flexible tubular profile 10 shown in the figures can be formed of a single layer of including plastic material or a laminate comprising a metal foil, giving the tubular profile better barrier properties. The tubular profile may be produced by a seam welded strip material, or alternatively may be in the form of an extruded tube which has been cut into sections of suitable length to form a tubular profile.

The tube neck 11 shown in FIG. 1 comprises a tapered insert section 12 and a shoulder section 13, which are connected via a ring section 14. The shoulder section 13 comprises a neck section 15 which is provided with an outer thread for a cap (not shown in the drawings). The tube shoulder may for instance be produced by injection molding, wherein a laminate circular blank may be added to the inside or outside of the shoulder section 13 to enhance its barrier properties.

The bottom end closure 16 shown in FIG. 2, comprises a flat lid section 17 and a tapered insert section 18 which continues into a ring-formed end section 19. The bottom closure may also be provided with a barrier enhancing laminate circular blank.

Both the ring section 14 and the end section 19 are provided with a circumferential groove 20 which is arranged to receive the respective end of the tubular profile 10. Each of the insert sections 12 and 18 are provided with a bead 21, at a certain distance from the respective circumferential groove 20.

FIG. 3 shows the first step of the application of a bottom end closure 16 into a tubular section 10, until it abuts the bead 21, with the aid of a pressure cylinder piston or curve actuated pressure means 22.

In the position shown in FIG. 4, heating energy is supplied to the circumference of the tube end and to the groove 20, via directed hot air jets which are represented by the arrows 23. The supplied hot air may have a temperature of e.g. about 300° C. and softens the plastic material locally.

FIG. 5 shows the final mounting step, in which the end closure 16 is pressed into the sealing position by means of a pressure piston 24. At this moment softened plastic material will be sheared off from the bead 21 by means of the extreme edge of the tubular section when it is displaced into the bottom of the groove 20. The result is a homogeneous confounding of the plastic in the tubular profile 10 and the bottom end closure 16, at the extreme edge of the tube end. A rapid cooling of the welding place is achieved by means of inner passages 25 for a cooling fluid.

FIG. 6 shows a device for supply of hot air to the heating stage shown in FIG. 4. The device comprises a cover 26 to envelop the mounting position for the end closure 16, at a certain distance, said closure having radially inward aimed exhaust passages 27 for hot air. The hot air is generated by means of a hot air generator 28, which is connected to the exhaust passages 27 via outer passages 29 in the cover 26. This is also provided with a central passage 30, which is connected to a suction means 31. In its turn this passage is connected to the hot air generator 28 via a passage 32. A bleed valve 33 is included in the channel 32, in order to release a certain amount of the recirculated air. This results in that a corresponding amount of relatively cold fresh air may pass the joint into central passage 30, so that heat is removed from that section of the tubular profile being remote from the joint.

A well defined local heating of the joint is achieved by means of the above described device. The energy consumption will be reduced and the effects on the surrounding environment will be minimized through the recirculation of hot air. Naturally, the device shown in FIG. 6 can be used both for mounting of bottom end closures and tube necks. Preferably, the mounting shown in FIGS. 3–5 is effected in an indexing swivel table, which step-by-step displaces tubular profiles between different work stations. During the stand-still phase in the work station shown in FIG. 3, a bottom closure 16 is applied, during the next phase shown in FIG. 4, the heating of the mounting place is effected, possibly in several steps and during the stand-still phase shown in relation with the work station shown in FIG. 5, the closure is pressed into its final mounting position.

The invention is not limited to the above described embodiment, but several variations are possible within the scope of the accompanying claims. For example, the heating of the joint can be made with other devices than the one shown in FIG. 6. The entire mounting sequence may be done in one work station. The invention may also be applied to the manufacturing of cans and bottles. The recirculation of hot air via the passage 32 is not necessary, but direct suction to the surrounding environment is also possible. Further, cooling of the mounting step shown in FIG. 5 may be made by means of cold air. If heating is obtained by high frequency welding, the circular bead 21 for defining an intermediate position will not be needed and the closure may be pressed all the way into its sealing position before supply of heating energy to the weld area.

What I claim:

1. In combination, an open tubular profile end and an end closure for said open tubular profile end, said end closure being constructed of heat softenable plastic material and including a first tapered insert end section and a second enlarged end section, said enlarged end section defining a peripheral groove extending thereabout, opening outwardly toward said tapered end section and including an integral peripheral bead defining the inner peripheral wall of said groove, extending continuously, in an uninterrupted manner, outwardly from said groove a predetermined distance toward said tapered insert end section and comprising a slight enlargement relative to the adjacent portion of said tapered insert end section, said open tubular profile end being snugly telescopingly engaged over said tapered insert end section up to said bead with the latter being abuttingly engaged by the terminal end of said open tubular profile end to limit telescopic engagement of said open tubular profile end over said tapered insert end section to an intermediate position with said open tubular profile end spaced along said end closure from said groove toward the free end of said tapered insert end section, said open tubular profile terminal end being operable, subsequent to heating of said bead, to shear the softened outer layer of said material from said bead and to displace the sheared softened material into said groove upon further forced telescopic engagement of said open tubular profile end over said tapered insert end section, the cooling of said sheared softened outer layer of said material displaced into said groove resulting in said open tubular profile end being sealingly secured in said groove.

2. The combination of claim 1 wherein said bead extends fully about the periphery of said enlarged end section.

3. The combination of claim 1 wherein said bead extends along said enlarged end section fully, in said uninterrupted manner, from the bottom of said peripheral groove to a point disposed said predetermined distance outwardly from said groove toward said tapered insert end section.

4. The combination of claim 3 wherein said groove tapers in transverse dimension toward said bottom of said groove.

* * * * *